US005928423A

United States Patent [19]

Toyota et al.

[11] Patent Number: 5,928,423

[45] Date of Patent: Jul. 27, 1999

[54] PNEUMATICALLY FED POWDER SUPPLY SYSTEM AND POWDER COATING APPARATUS

[75] Inventors: Hiromichi Toyota, deceased, late of Tokyo, by Masumi Toyota, Sakae Toyota, Michie Toyota, heirs; Yasuhiro Sawada, Tokyo, both of Japan

[73] Assignee: Rid Corporation, Japan

[21] Appl. No.: 08/447,527

[22] Filed: May 23, 1995

[30] Foreign Application Priority Data

May 24, 1994 [JP] Japan .................................... 6-110009

[51] Int. Cl.[6] ................................ B05B 7/14; B05B 7/24; B05C 19/06; B65G 53/14

[52] U.S. Cl. .......................... 118/308; 118/309; 118/300; 239/74; 239/311; 134/102.2; 134/167 C

[58] Field of Search .................................... 118/308, 309, 118/300, 651, 644, 621, DIG. 5, 652, 645, 653, 654, 302; 239/74, 302, 310, 311; 451/3; 134/7, 22.1, 22.11, 22.18, 24, 102.2, 95.2, 166 R, 168 C, 167 C, 166 C

[56] References Cited

U.S. PATENT DOCUMENTS

| | | | |
|---|---|---|---|
| 4,823,731 | 4/1989 | Howeth | 118/326 |
| 4,881,563 | 11/1989 | Christian | 134/166 |
| 5,085,170 | 2/1992 | Hüttlin | 118/303 |
| 5,140,935 | 8/1992 | Gruber | 118/621 |
| 5,170,591 | 12/1992 | Brielmaier et al. | 451/36 |

*Primary Examiner*—Stanley S. Silverman
*Assistant Examiner*—Jos'e A. Fortuna
*Attorney, Agent, or Firm*—Price, Heneveld, Cooper, DeWitt & Litton

[57] ABSTRACT

A color-changing powder supply system for use in powder coating, etc. which can perform the color changing in a shorter time, has a simpler structure, requires less expensive equipment cost and installation/setup cost, and can be operated more easily and surely than prior art systems, and a powder coating system which has a high effective rate of operation by utilizing the powder supply system. The pneumatically fed powder supply system comprises a powder tank, a powder supply apparatus detachably connected to the powder tank, and means for cleaning the powder supply apparatus. The powder coating system employs the pneumatically fed powder supply system.

15 Claims, 13 Drawing Sheets

PNEUMATICALLY FED POWDER SUPPLY SYSTEM AND POWDER COATING APPARATUS

FIELD OF THE INVENTION

The present invention relates to a powder supply system capable of successively supplying various sorts of powder such as multicolor powdery paints, which are substantially constant in physical properties, but have different colors, by using the same pneumatically fed powder flow measuring/controlling device with the color changing operation in a short period of time in units of fixed amount without mixing colors. The invention also relates to a powder coating apparatus employing the powder supply system.

DESCRIPTION OF RELATED ART

Heretofore, a pneumatically fed powder automatic supply/control system (see Japanese Patent No. 1731020) shown in FIG. 13 of the accompanying drawings is known as being used with an apparatus for accurately supplying expensive powder to each of several or several tens applicators in units of relatively small supply amount of several tens to several hundreds grams per minute, e.g., an electrostatic powder coating apparatus. In such a system, measuring gas 117 is blown into a measuring thin pipe line 101 from a nozzle 103 at a constant speed so that fluidized powder 114 in a powder tank 113 is introduced to a passage 104. When the powder is accelerated through the measuring pipe line 101, the differential pressure generated across the measuring pipe line 101 is measured by a differential pressure gauge 106 to determine a mass flow rate of the powder. Based on the determined mass flow rate, driving gas 121 supplied to an injector 124 comprising a throat 118 and a nozzle 119 is automatically controlled by automatic control means (not shown) for maintaining a predetermined amount of supplied powder at all times.

Another type of powder supply apparatus utilizing a mechanical powder dispenser, as shown in FIG. 14, is also practiced. Specifically, a bulk specific gravity equalizing device 127, a pressure equalizing pipe 128, etc. are provided so that the amount of powder such as a powdery paint taken out from the tank 113 by a screw feeder 122 is correlated with the rotational speed of a motor 123 as uniquely as possible. The powder is then supplied by the injector 124 comprising the throat 118 and the nozzle 119, while the amount of supplied powder is estimated by a motor rotational speed setter 125 from the reading on a tachometer 126. In that powder supply apparatus, the bulk specific gravity equalizing device functions such that the amount of powder taken out per unit number of rotations of the screw feeder 122 is less affected by variations in powder level within the tank, but generally it cannot be adapted for change in the sort of powder. Therefore, whenever the sort of powder is changed, an assay must be carried out and a preliminary operation is required in many cases prior to starting up the operation of the apparatus. While a turntable, a grooved roll feeder, a vibratory feeder, etc. may be used in the mechanical powder dispenser instead of the screw feeder, any type of dispenser accompanies the almost similar problems.

FIG. 15 shows principal part of a pneumatically fed powder supply system for color changing which is constructed by the prior art powder supply apparatus shown in FIG. 13 or 14 and is employed for multicolor and multiline electrostatic powder coating. In the illustrated system, the number of colors is three and the number of guns is four. As seen from FIG. 15, the system requires tanks 113 in the same number three as the colors, and powder supply apparatus 129 in the number twelve, i.e., (the number of colors)×(the number of guns)=3×4. Paints are supplied to four guns 122 through color changers 131 in the same number four as the number of guns and respective gun pipings 132. Also as seen from FIG. 15, tank pipings 130 between the powder supply apparatus 129 and the color changers 131 are very large in number and extremely intricate. Furthermore, the tanks need a large installation area and the mechanism has a complicated structure. Therefore, the color changing operation for the tanks 113 and the powder supply apparatus 129 takes a great deal of time and labor. The equipment cost, the installation/setup cost, the operation maintenance/service cost, etc. of the entire system is extremely considerable.

Stated otherwise, the prior art pneumatically fed powder supply system for color changing as shown in FIG. 15 requires very intricate pipings, color changers, and powder supply apparatus in the same number as guns for each of tanks for different colors. Particularly, in the system using the mechanical powder dispenser shown in FIG. 14, the mechanical structure is complex and several expensive mechanical powder dispensers must be installed in each of the tanks. This considerably pushes up the cost of the tank adapted for multicolor changing, and necessitates much time when the paint in the tank is exchanged. In short, the prior art system is problematic in that the mechanism is complicated and expensive, the installation/setup work is time consuming, the maintenance work needs a high degree of skill and is time consuming, and hence the operating cost is extremely high.

SUMMARY OF THE INVENTION

First means for solving the problems in the prior art systems shown in FIGS. 13, 14 and 15 resides in that the powder supply apparatus is structured to be capable of easily cleaning it and is detachably connected to a powder suction port formed on a top of the powder tank, and means for cleaning the powder supply apparatus is provided. When changing the color of powder, the powder supply apparatus itself is cleaned and then connected to a tank containing powder in color to be next used (hereinafter referred to as a standby tank). After such a color changing operation, the system can be immediately restarted using the powder in desired next color.

More specifically, in a pneumatically fed powder supply system in which powder flow detecting gas is introduced to a measuring thin pipe line with a diameter smaller than a powder feeding thick pipe line at a constant speed through a sensor nozzle, means for introducing powder to an inlet of the measuring thin pipe line is provided, a mass flow rate of the powder is detected based on the differential pressure generated across the measuring thin pipe line when the powder is accelerated, and gas feeding means is automatically controlled so that the differential pressure is held at a constant level, the powder supply apparatus is structured to be capable of easily cleaning its interior, and means for cleaning the powder supply apparatus is provided, the powder introducing means is formed of a pipe which extends downward from the inlet of the measuring thin pipe line and is structured so as to avoid sticking of powder to the utmost by using a material to which powder is hard to stick (hereinafter referred to as a powder introducing pipe). The powder introducing pipe is inserted to a powder layer in a powder tank, and the pneumatically fed powder supply apparatus (hereinafter referred to as the powder supply apparatus) including the measuring thin pipe line is detachably connected to the powder tank. When changing the color of powder to be next used, the powder supply apparatus is disconnected from the current powder tank (i.e., the powder tank used just before color changing), cleaned by the cleaning means, and then connected to any desired standby powder tank (i.e., a new powder tank to be used after color changing). After that, the operation of the system is immediately restarted. With that arrangement, the powder supply apparatus is only required in the same number as the number of guns, and can be directly coupled to the corresponding gun. Therefore, color changers can be dispensed with, and the complex tank pipings 130 shown in FIG. 15, other wirings and pipings (not shown) necessary for control purposes, etc. are no longer needed.

In the present invention, the powder supply apparatus and the powder tank can be detachably connected to each other through the powder introducing pipe in two ways. According to one way, the powder introducing pipe is fixed to the powder supply apparatus and is detachably inserted through a powder introducing pipe insertion port formed in a top wall of the powder tank to such an extent as to enter the powder layer. In this case, means for cleaning inner and outer surfaces of the powder introducing pipe is required in addition to the means for cleaning the powder supply apparatus. The former cleaning means is provided on the tank above the insertion port, or is separately located away from the insertion port of the tank. According to the other way, the power introducing pipe is fixed in the powder tank such that it is extended from the top wall of the powder tank to enter the powder layer, and the powder supply apparatus is detachably connected to an upper end of the powder introducing pipe. To effect the color changing, it is only required to clean the interior of the powder supply apparatus disconnected from the powder introducing pipe fixed to the powder tank. In this case, when supplying the powder through plural lines from one tank, a plurality of the powder introducing pipe are coupled together by a manifold, and a plurality of powder supply apparatus are also coupled together by another manifold, enabling the powder introducing pipe and the powder supply apparatus to be detachably connected to each other through the manifolds. This arrangement is effective in surely finishing the color changing operation in a short time and reducing the power supply apparatus in size and cost.

Cleaning the interior of the power supply apparatus can be achieved by introducing gas at a high speed, i.e., a blow, therethrough on condition that the inner surface is formed of a material such as fluorine-contained polymers or high-density polyethylene to which powder is hard to stick, and is given with proper conductivity. To treat the gas containing powder discharged during the cleaning, a discharging pipe line is provided midway the main piping to suck a large amount of discharged gas therethrough, and the sucked gas is treated by a dust collector or the like. Further, to remove the powder sticking to outer surfaces of the gun and the piping adjacent the gun, gas is blown to those surfaces at a high speed, and the gas containing powder produced at this time is sucked by a gun's outer surface cleaner fitted to surround the gun and thereabout, followed by being discharged to the dust collector for treatment. These features are also included in the present invention.

Realizing the above-mentioned structure where the powder supply apparatus is detachably connected to the paint tank is actually impossible in the powder supply apparatus utilizing the mechanical powder dispenser as shown in FIG. 14.

In the present invention, the powder supply apparatus is detachably connected to the powder tank through the powder introducing pipe, the powder tank is prepared in the same number as desired number of powder colors, and the powder supply apparatus is connected to the powder tank containing the powder in desired color such that the powder introducing pipe enters the powder layer. In this condition, the powder is sucked from the tank to the powder supply apparatus. When changing the color of powder to be used, the powder supply apparatus is disconnected from the powder tank, cleaned by the cleaning means, and then connected to a desired one of standby tanks. Thereafter, the system can be immediately restarted in operation. With this arrangement, since the powder tank has a very simple and small structure and becomes inexpensive, the color changing can be effected in a flexible manner by preparing the powder tanks each containing one sort of powder in the same number as the desired number of colors. Further, the powder tank can be easily cleaned in a short time when the powder is to be changed, and the color changing time is remarkably shortened. It is hence possible to greatly increase the rate of operation of the entire powder coating process, and to reduce the operation maintenance/service cost.

The powder supply apparatus is only required in the same number as the guns. Because the intricate tank pipings shown in FIG. 15 are no longer needed, the powder supply apparatus can be directly coupled to the corresponding gun in one-to-one relation, and color changers can be dispensed with. As a result, not only the equipment cost but also the cost required for installation/setup and maintenance/service can be cut down to a large extent. In the present invention, those portions from the powder supply apparatus to the gun must be cleaned for color changing. In the conventional system shown in FIG. 13, the portions from the color changer to the gun similarly must be cleaned. Thus, there is not much difference between the present invention and the prior art in point of the cleaning operation.

In the present invention, since the system including the powder supply apparatus and the gun can be cleaned in a condition where powder supply apparatus is disconnected from the powder tank, the cleaning operation is reliably performed and easily automated. Additionally, by providing a gun's outer surface cleaner and sucking the discharged gas blown for cleaning from an intermediate portion of the main piping, it is possible to surely prevent an inner space of the booth from being contaminated with scattered powder during the cleaning. Consequently, the color changing cost can be further cut down.

DETAILED DESCRIPTION OF THE PREFERRED EMBODIMENTS

Figure 1:
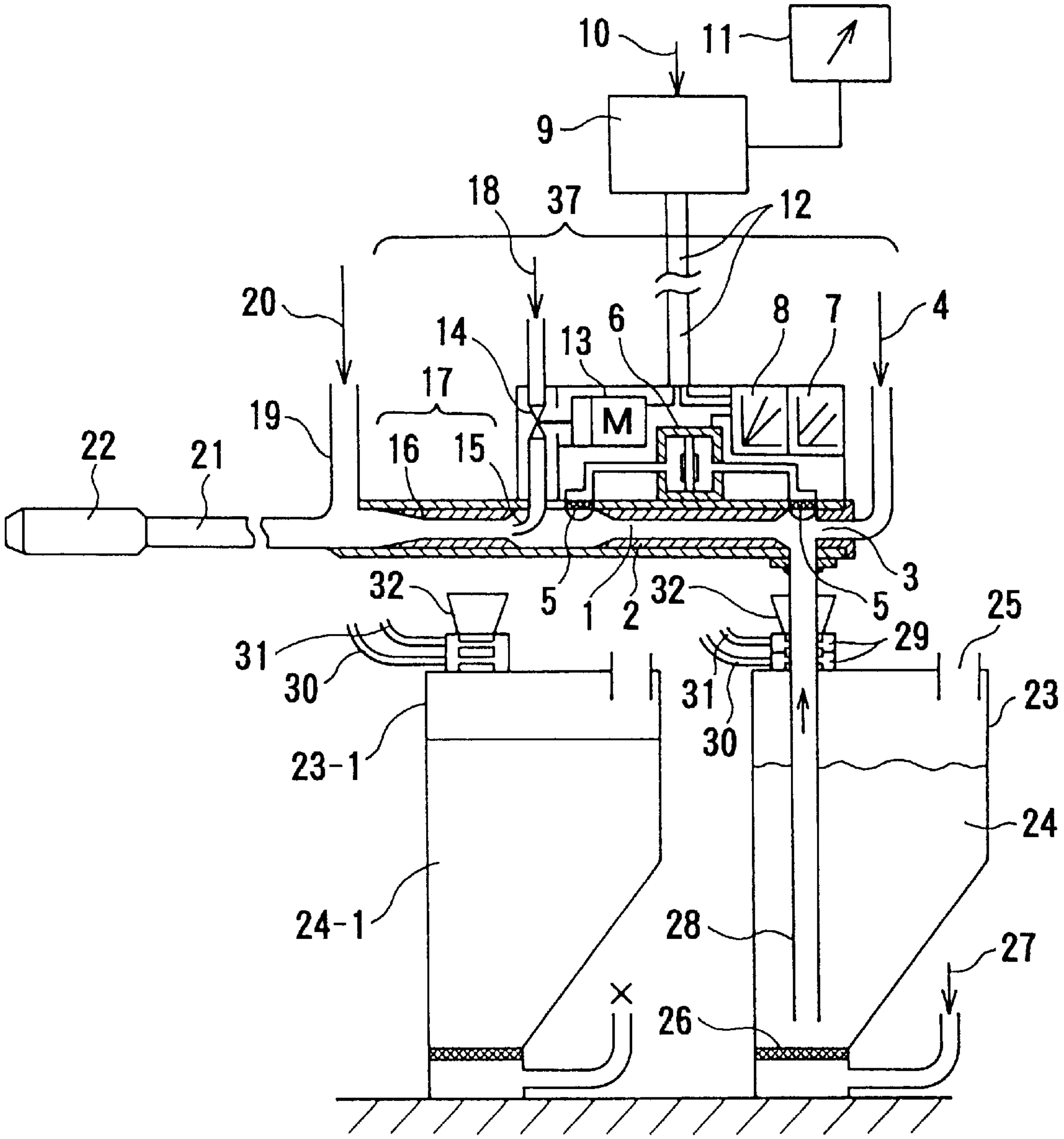
FIG. 1 is a sectional view of principal part of one embodiment of a powder coating apparatus utilizing a pneumatically fed powder supply system according to the present invention.
Figure 2:
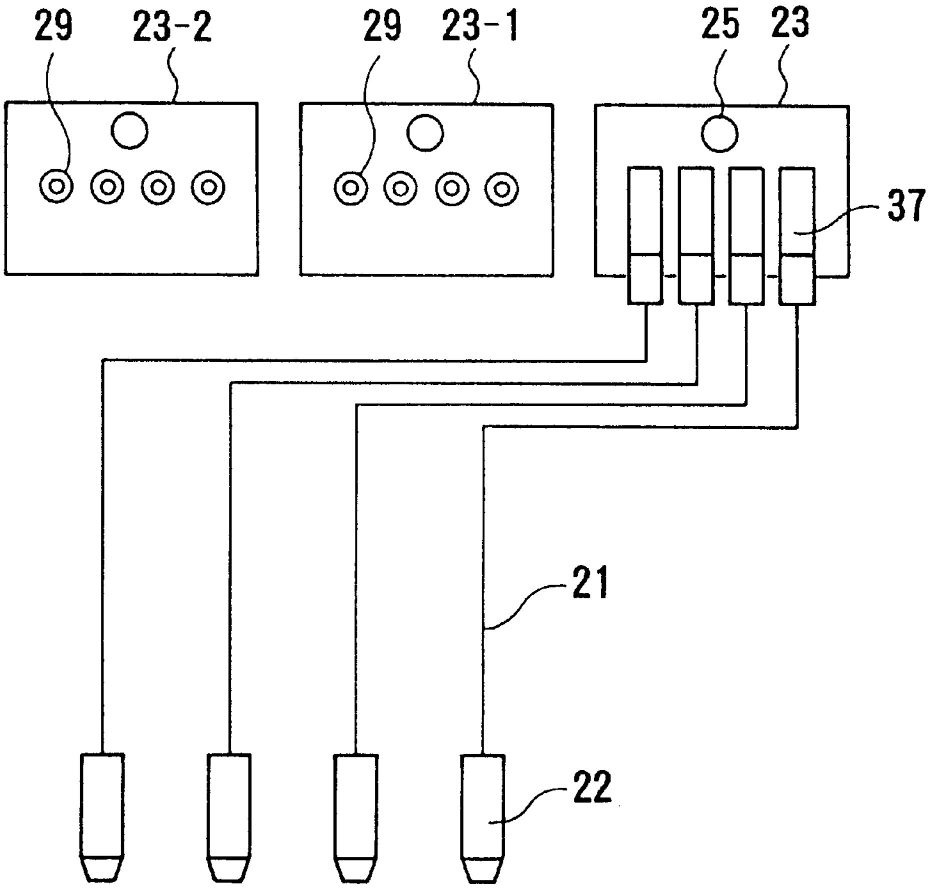
FIG. 2 is a plan view of an entire system configuration constructed by the apparatus having the structure shown in FIG. 1.
Figure 3:
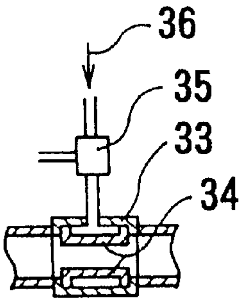
FIG. 3 is a sectional view of a pinch valve which can be employed in the present invention.
Figure 4:
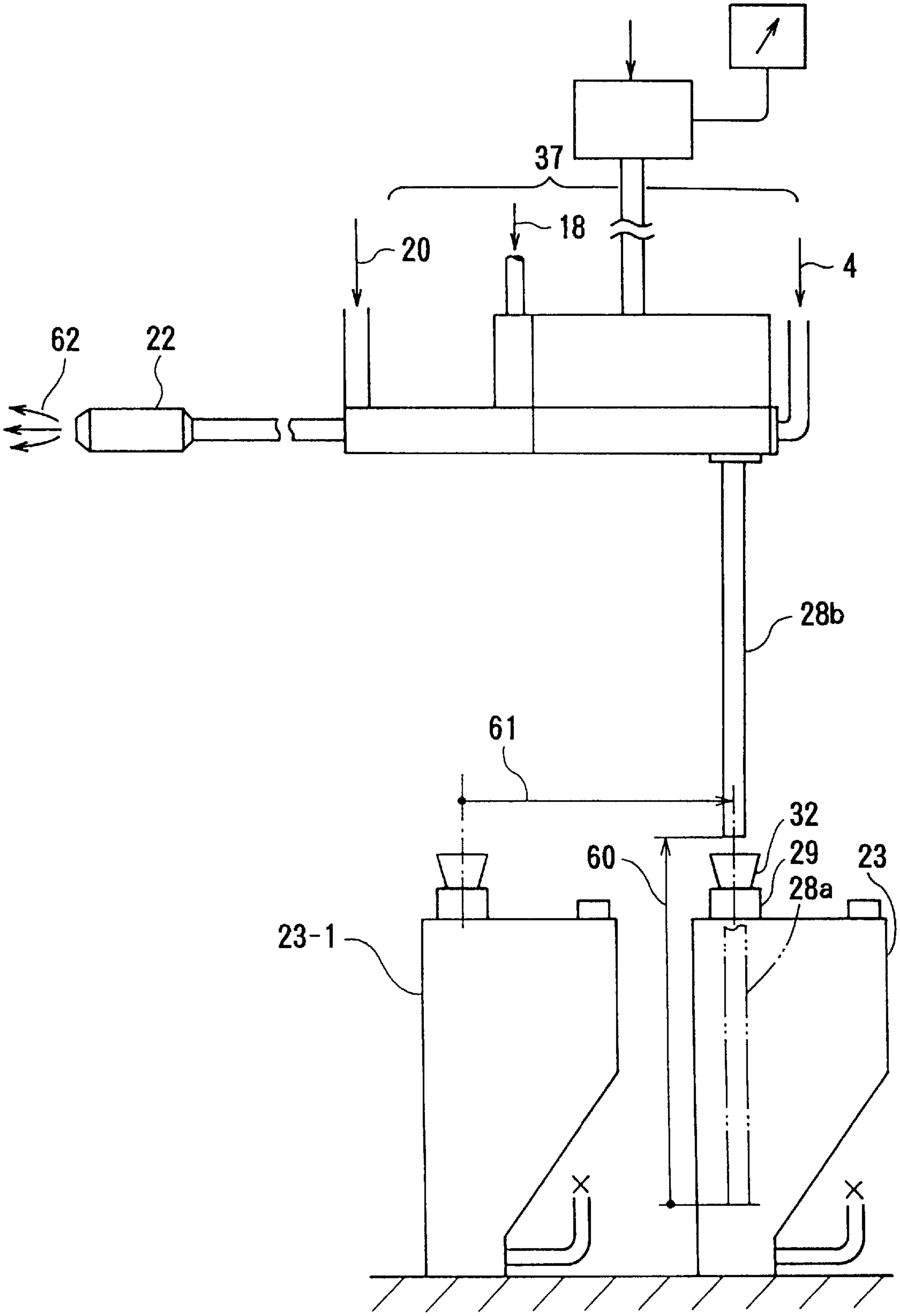
FIG. 4 is a side view of the apparatus having the structure shown in FIG. 1 under cleaning in the course of color changing.

A pneumatically fed powder supply system according to the present invention will be described below with reference to the accompanying drawings. FIG. 1 shows an inner structure of one typical powder supply apparatus in operation and one example of the color changing operation, FIG. 2 shows one example of the system configuration, FIG. 3 shows one example of an inner structure of accessory means, and FIG. 4 shows a manner of switching over the powder supply apparatus in the color changing operation.

In FIG. 1, a sensor tube 2 is made of a material to which powder is hard to stick, such as fluorine-resin-high-density polyethylene urethane. A measuring thin pipe line 1 with a diameter smaller than a powder feeding thick pipe line 21 is disposed along an axis of the sensor tube 2. Powder flow detecting gas 4 regulated to a constant flow rate is blown into the measuring thin pipe line 1 from a sensor nozzle 3. Powder 24 stocked in a powder tank 23 and fluidized by fluidizing gas blown through a perforated plate 26 as indicated by arrow 27 is thereby sucked up through a powder introducing pipe 28 made of a material to which powder is hard to stick. The sucked-up powder is accelerated in the measuring thin pipe line 1 to a certain speed. At this time, the differential pressure generated across the measuring thin pipe line 1 is proportional to a mass flow rate of the powder flowing through the measuring thin pipe line 1.

The generated differential pressure is detected by a differential pressure sensor 6 through filters 5 made of a material to which powder is hard to stick. An output of the sensor 6 is, as needed, introduced by a multicore cable 12 to an automatic controller 9 through regulators 7, 8 for adjusting the zero point and the output sensitivity and an amplifier (not shown). Also, the mass flow rate of powder is introduced to display or output means 11 for indicating or outputting the data. The automatic controller 9 compares a signal indicative of the mass flow rate of powder with a set signal 10, and controls a motor 13 based on an output produced by amplifying the compared difference. Driving gas 18 is introduced to an injector 17 which comprises a nozzle 15 and a throat 16 and develops suction force necessary for generating the differential pressure required to suck up the powder from the tank and to accelerate the sucked-up powder in the measuring thin pipe line 1. The driving gas 18 is adjusted by a valve 14 so that a predetermined amount of powder is always supplied to an electrostatic powder gun 22 through the powder feeding thick pipe line 21 made of a material to which powder is hard to stick. The supplied powder is applied to an object (not shown) to be subject to electrostatic powder coating. The powder is thereby coated with high quality and low cost while ensuring a desired coating thickness. Additionally, a pipe line 19 is used in normal operation to introduce carrier gas 20 necessary for maintaining a powder feed speed in the powder feeding thick pipe line 21 at a proper value.

Since the fixed amount powder supply system described above has a simple inner structure and is in the form of a cylinder made of a material to which powder is hard to stick, the interior can be easily cleaned by means such as a blower.

Also, since a differential pressure detecting/controlling module comprising the sensor nozzle 3, the powder introducing pipe 28, the sensor tube 2, the injector 17 and the differential pressure sensor 6 has a very narrow width and a small size, the powder tank 23 can be easily constructed with a small size even when the module is incorporated in multiple rows. FIG. 3 shows a pinch valve of structure that two pieces of pinch rubber 34, to which powder is hard to stick, are fixed to opposite inner surfaces of a pinch valve housing 33. Driving gas 36 is introduced or cut off through a three-way valve 35 to close or open a passage. The pinch valve is usually disposed, if necessary, between the downstream filter 5 and the injector 17.

In FIG. 1, denoted by 29 is cleaning means which comprises ring chambers and ring slits in two stages, and provides an insertion port of which inner diameter is a little larger than the powder introducing pipe 28 so that the pipe 28 is inserted through the insertion port. Pipe lines 30, 31 are connected to the respective ring chambers. The cleaning means 29 also includes a guide 32 for guiding the powder introducing pipe 28 when it is inserted to the tank 23. As shown, the cleaning means 29 is fixed to an upper cover of the powder tank 23, and the powder introducing pipe 28 is inserted to a fluidized powder layer 24 through the cleaning means 29. During normal operation, a small amount of gas is always introduced through one or both of the pipe lines 30, 31 to prevent scattering of the powder. Denoted by 23-1 is a standby powder tank which is used for color changing and containing powder 24-1 in different color.

The color changing operation is performed as follows. After stopping the flow of the fluidizing gas indicated by arrow 27, a large amount of gas is introduced through the pipe line 30 to blow off the powder sticking to an outer surface of the powder introducing pipe 28 and the pipe line 31 sucks the gas introduced from the pipe line 30 and the ambient air for cleaning the outer surface of the powder introducing pipe 28, while a powder supply apparatus 37 is pulled up by a pull-up device (not shown). At this time, the injector driving gas 18 is stopped, but the powder flow detecting gas 4 and the carrier gas indicated by arrow 20 remain continuously introduced. This allows the gas to flow downward through the powder introducing pipe 28 for discharging the powder remaining inside the pipe 28 to the powder tank. Depending on conditions, discharge and suction of the powder remained inside the powder introducing pipe 28 can be prevented by using the pinch valve shown in FIG. 3. As shown in FIG. 4, pulling-up of the powder supply apparatus 37 is stopped at a level where a lower end of the powder introducing pipe 28 reaches a position a little higher than the guide 32. In this condition, amounts of both the driving gas 18 for the injector 17 and the carrier gas indicated by arrow 20 are increased simultaneously. A large amount of ambient air is thereby sucked from the lower end of the powder introducing pipe 28 to flow through the interiors of the powder introducing pipe 28, the sensor tube 2, the injector 17, the powder feeding thick pipe line 21, and the gun 22 for cleaning all the portions contacting the powder. Preparation for color changing is thus completed.

Note that, in FIG. 4, the internal structure of the powder supply apparatus 37 and the cleaning means 29 is the same as shown in FIG. 1, and the pipe lines 30, 31 are omitted.

Then, the powder tank 23 is removed away and the standby power tank 23-1 is moved to the position where the powder tank 23 has been placed. A small amount of gas is introduced to each of the pipe lines 30, 31 of the tank 23-1, the fluidizing gas indicated by arrow 27 is introduced to the tank 23-1 to fluidize powder therein, and the driving gas for the injector 17 is adjusted so that a positive pressure is created in the interior of the powder introducing pipe 28. In this condition, the pull-up device is reversely actuated to move downward into the tank through the cleaning means 29 to establish the predetermined positional relationship shown in FIG. 1. The color changing operation is thus completed. A small amount of gas is preliminarily blown, as needed, to purge out the powder possibly remaining in the powder supply apparatus. Thereafter, the system can be restarted using the powder 24-1 in different color in a short time. While the above operation is described as keeping the powder supply apparatus at a fixed position and replacing the powder tank, the present invention can be equally practiced with an arrangement that the powder tank is kept at a fixed position and the powder supply is moved to the desired tank. In any case, the replacement of the powder tank or the movement of the powder supply apparatus can be finished in a short time and, if necessary, can be easily automated.

Figure 15:
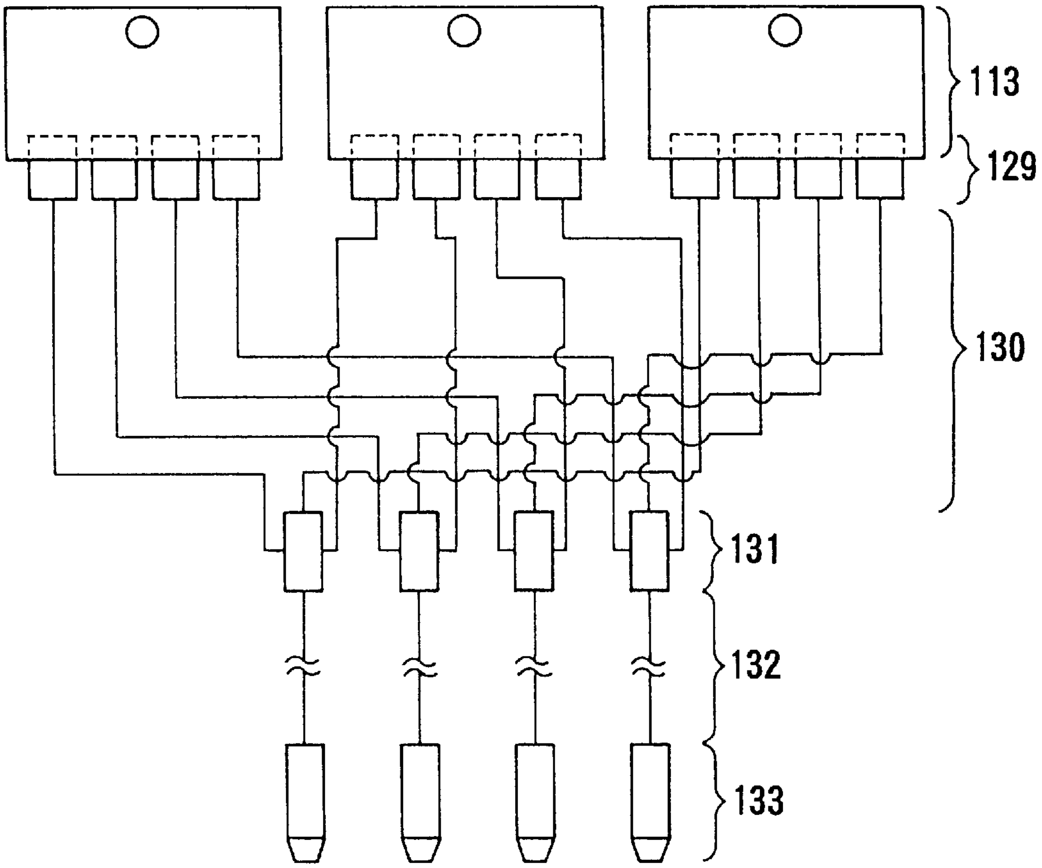
Fig. 15 PRIOR ART
FIG. 15 is a plan view of an entire configuration of a powder supply system for color changing constructed by using the powder supply apparatus of the prior art.

FIG. 2 shows one example of a powder coating system according to the present invention which has four guns and can selectively change three colors. In the illustrated system, the powder tank 23 is now under operation. Denoted by 23-1, 23-2 are standby powder tanks, and 29 is cleaning means provided on an upper surface of the powder tank to clean the powder introducing pipe. As seen from FIG. 2, four-row powder supply apparatus 37 and four guns 4 are directly coupled to each other by four powder feeding thick pipe lines 21. The color changing is performed by selecting one of the three small-sized powder tanks of simple structure and setting the powder supply apparatus to the selected tank by using simple mechanical devices (not shown), after cleaning the interior of the pipe line leading from the powder introducing pipe to the gun outlet and the outer surface of the powder introducing pipe in accordance with the above-mentioned procedures. Upon completion of the color changing operation, the system can be restarted immediately. The advantage of the present invention will be apparent at a glance from comparing FIG. 2 according to the present invention and FIG. 15 of the prior art, both the system configurations being required to achieve the same design specifications.

Figure 5:
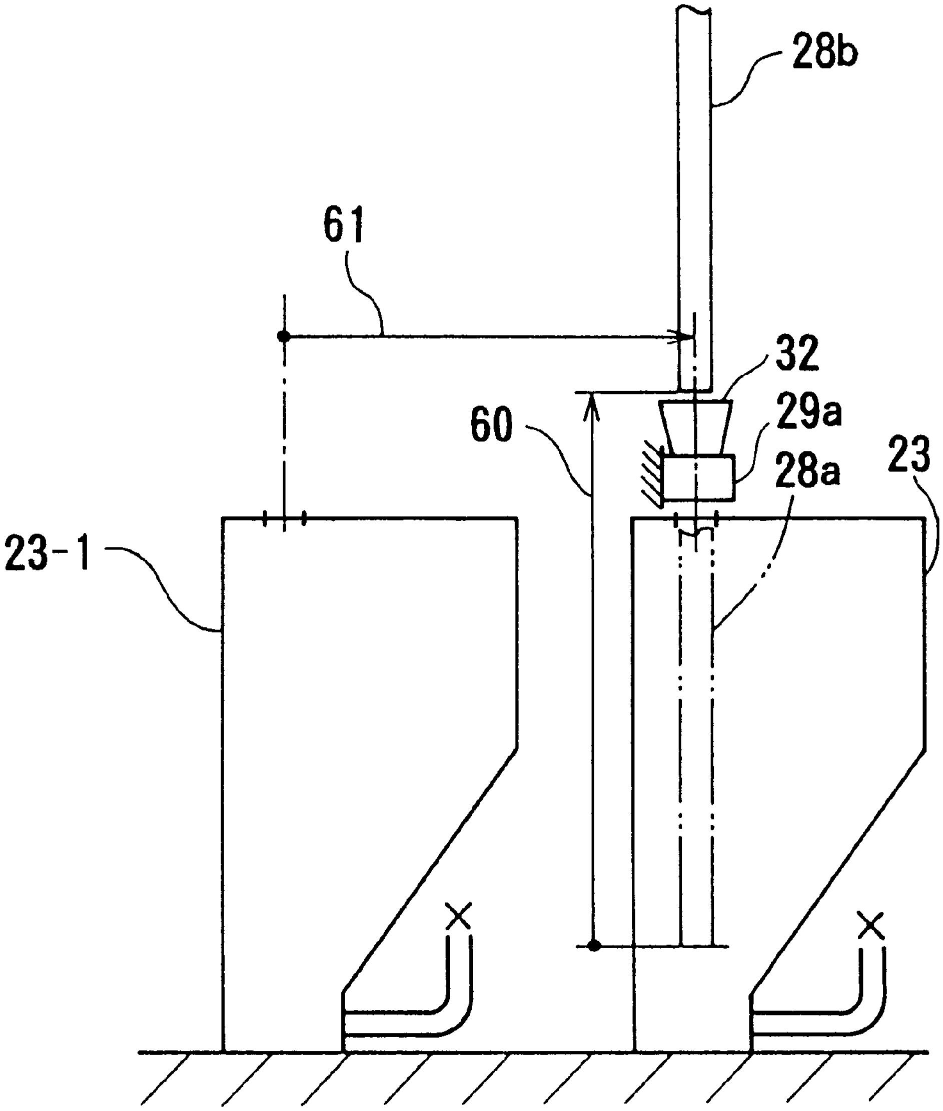
FIG. 5 is a side view of a portion of FIG. 4, the view showing another embodiment.
Figure 6:
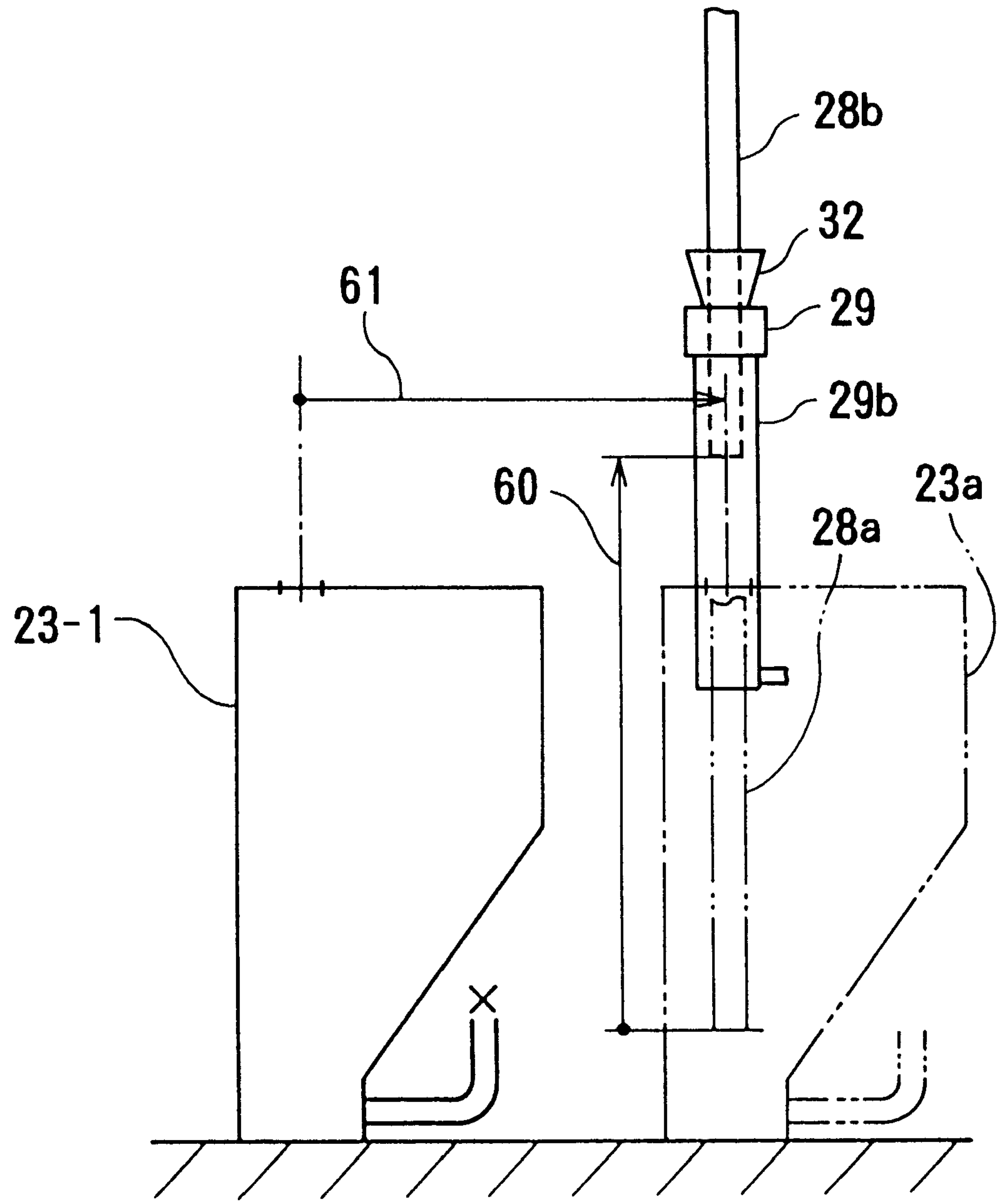
FIG. 6 is a side view of a portion of FIG. 4, the view showing still another embodiment.

In the above-described system, as seen from FIG. 4, it is necessary to pull up the powder introducing pipe from its position during operation indicated by 28*a* to its position after cleaning indicated by 28*b* through a cleaning pull-up stroke 60, and to provide the cleaning means 29 on each of the powder tanks. Further, a discharged blow 62 containing the powder is produced, which gives rise to a fear that the inner space of a booth, etc. may be contaminated. These points can be improved as follows. The cleaning means 29 may be separated from the tank for use in common to the plural tanks. As shown in FIG. 5, separate cleaning means 29*a* is provided just above the tank 23 under operation to be aligned with a position where the powder introducing pipe is inserted to the tank. The cleaning procedures are the same as described above in connection with FIG. 4. With this modified embodiment, the cleaning means and the guide are not needed for each of the tanks. Alternatively, as shown in FIG. 6, after pulling up the powder introducing pipe from a position indicated by two-dot-chain lines 28*a* to a position indicated by solid lines 28*b* and removing away a tank 23*a* for which the operation has been completed, separate cleaning means 29 provided with a receiver 29*b* for receiving the falling powder and a guide 32 is pulled up coaxially with the powder introducing pipe indicated by 28*b* for cleaning the same in the illustrated condition. In this case, the stroke through which the powder supply apparatus is moved vertically is the same as in FIG. 4. Also with this another modified embodiment, the cleaning means 29 and the guide 32 are not needed for each of the tanks.

In that another modified embodiment, however, there is needed a device for positioning and moving the cleaning means 29 provided with the receiver for receiving the powder falling from the powder introducing pipe which has been pulled up through the stroke 60 with the powder kept stuck to the outer surface of the pipe. Such a device for positioning and moving the cleaning means 29 is omitted from FIG. 6.

Figure 7:
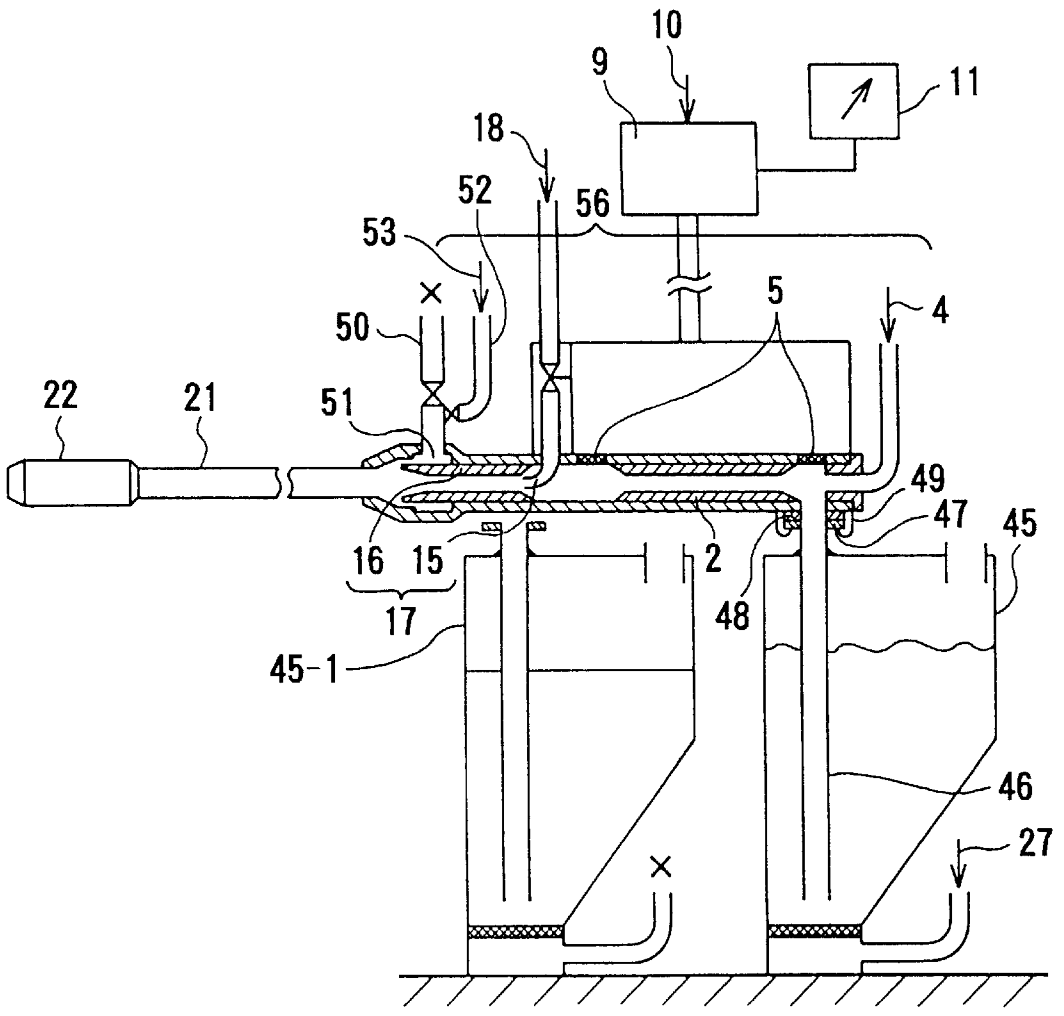
FIG. 7 is a sectional view of principal part of a powder coating apparatus utilizing a pneumatically fed powder supply system according to the present invention, the view showing another embodiment different from that shown in FIG. 1.
Figure 8:
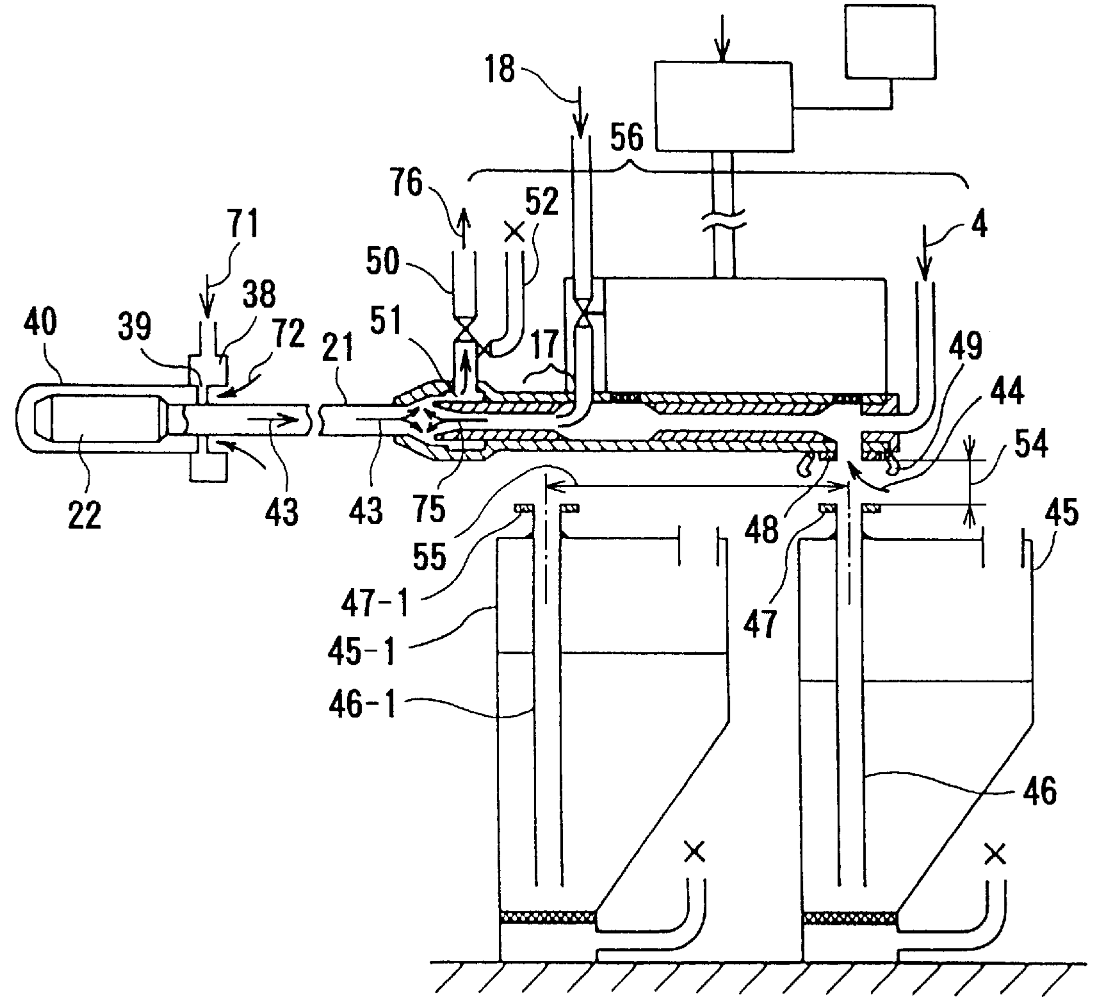
FIG. 8 is a sectional view of principal part of the apparatus having the structure shown in FIG. 7 under cleaning in the course of color changing.
Figure 9:
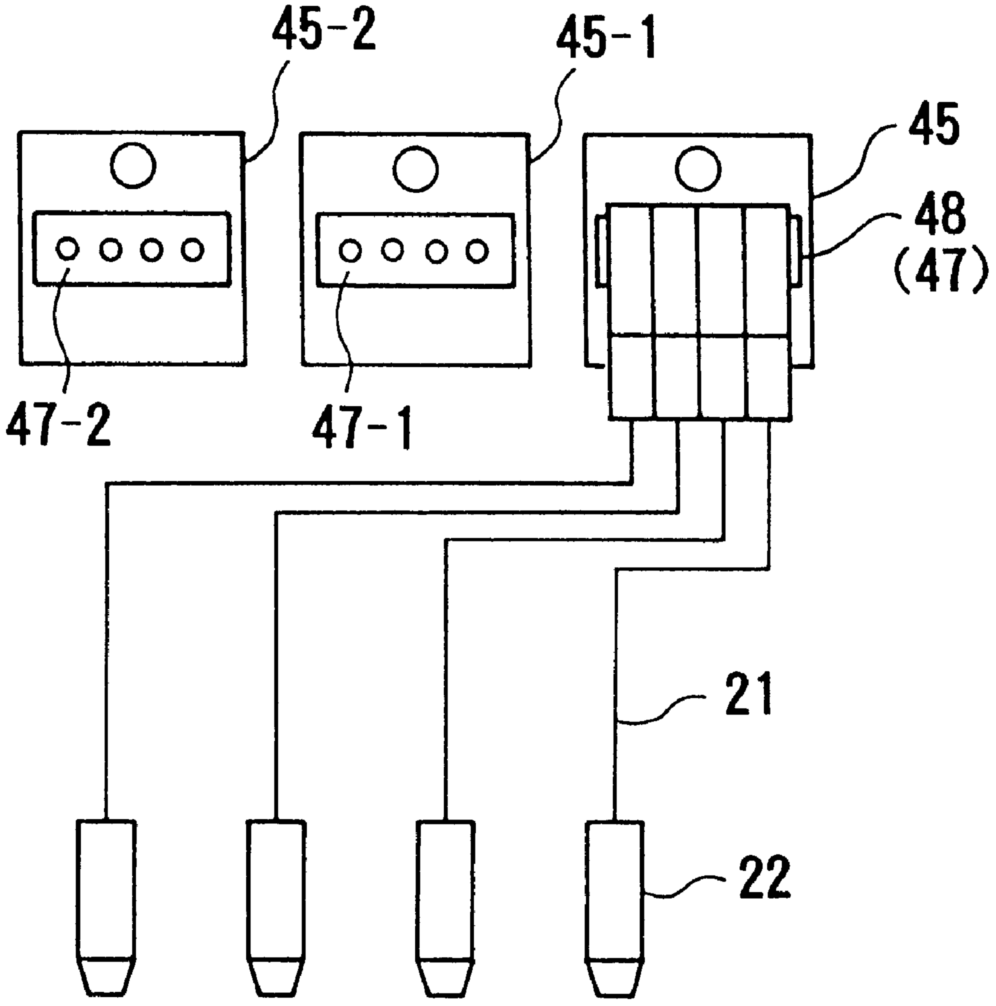
FIG. 9 is a plan view of an entire system configuration constructed by the apparatus shown in FIGS. 7 and 8 and FIG. 10 and 11.

FIGS. 7, 8 and 9 show another embodiment of the present invention. This embodiment is different from the embodiment of FIG. 1 in that the powder introducing pipe is provided as a powder introducing pipe 46 attached in a powder tank 45, and a powder supply apparatus 56 is detachably connected to an upper end of the powder introducing pipe 46 for color changing. FIG. 8 shows a state under cleaning where the powder supply apparatus 56 is disconnected from the powder tank 45 to effect the color changing. In this embodiment, upper ends of the plural powder introducing pipes 46 are coupled together by a manifold 47 in parallel, and the corresponding powder supply apparatus 56 in the same number as the pipes 46 are also coupled together by a manifold 48 in parallel, the manifolds 47, 48 having with the same opening diameter and the same pitch. These two manifolds are closely joined to each other by using a fastener 49 and, thereafter, the system is operated in a normal manner. 45-1 denotes a standby tank provided with a powder introducing pipe. In FIG. 7, during the normal operation, carrier gas 53 is ejected into the powder feeding thick pipe line 21 through a pipe line 52 and a ring chamber 51 formed around the injector throat 16 for propelling the powder to be fed, while a pipe line 50 is kept closed. FIG. 9 shows the entire system configuration including three tanks and four guns according to this embodiment. 45 denotes the tank provided with the powder introducing pipe which is now under operation, with the manifolds 48 and 47 closely joined to each other. Manifolds 47-1, 47-2 coupling the powder introducing pipes of standby tanks 45-1, 45-2 are shown as being exposed to the outside.

FIG. 8 shows a state of the system shown in FIGS. 7 and 9 under cleaning to effect the color changing. In this state, the fastener 49 is unlocked, the manifolds 48 and 47 are separated from each other by a small stroke 54, the tank fluidizing gas 27 and the carrier gas 53 (27 and 53 shown in FIG. 7) are stopped, and a gun's outer surface cleaner 40 is fitted over the gun 22. Gun's outer surface cleaning gas 41 (FIG. 11) is introduced to a ring chamber 38 (FIG. 8) of the cleaner 40 as indicated by arrow 71, and then ejected through a ring ejection port 39 so as to remove the powder sticking to outer surfaces of the gun and the nearby pipe line. In addition, clean ambient air 72 is sucked together. The introduced gas and the sucked air are taken in at a high speed from a leading end of the gun 22 to produce a high-speed intake flow 43. Accordingly, the outer and inner surfaces of the gun 22 and the pipe line 21 are cleaned in a short time. Furthermore, the injector 17 is actuated by introducing the driving gas 18 in a condition of sucking no powder, whereupon a large amount of clean air is taken in as indicated by arrow 44 so that the interiors of the sensor tube 2 and the injector 17 are cleaned in a short time as indicated by arrow 75. The much intake flows 43, 75 thus produced are discharged through the pipe line 50 under action of the ring chamber 51 as indicated by arrow 76, followed by entering a dust collector for treatment. In this way, the interior of the powder supply apparatus 56 and the outer and inner surfaces of the gun 22 and the pipe line 21 are completely cleaned without contaminating the inner space of the booth, etc. During the above process, the tank 45 is removed away, and the standby tank 45-1 provided with the powder introducing pipe is moved through a stroke 55. Then, the powder supply apparatus 56 is lowered through a stroke 54 and the fastener 49 is locked to closely join the manifolds 47, 48 to each other. After that, the next operation can be started immediately.

In the system of FIG. 7, the powder supply apparatus 56 is only required to be pulled up from the powder introducing pipe attached in the tank through the small stroke 54 (shown in FIG. 8) on the order of 30 to 50 mm. Also, even with the powder introducing pipe fixedly attached in each of the tanks, the cost is very low. Since the powder supply apparatus is associated with a number of pipings and wirings, such a reduction in the stroke 54 is very advantageous in many practical cases. Also, employing the manifold coupling method provides many merits such as considerably reducing the apparatus size, facilitating the positioning operation, and improving the operability of the system.

It is a matter of course that the arrangement for cleaning the outer surface of the gun, etc. and treating the discharged gas after cleaning, as shown in FIG. 8, is also applicable to the system shown in FIG. 1. Further, the cleaning and treating process as shown in FIG. 8 can be easily automated.

Figure 12:
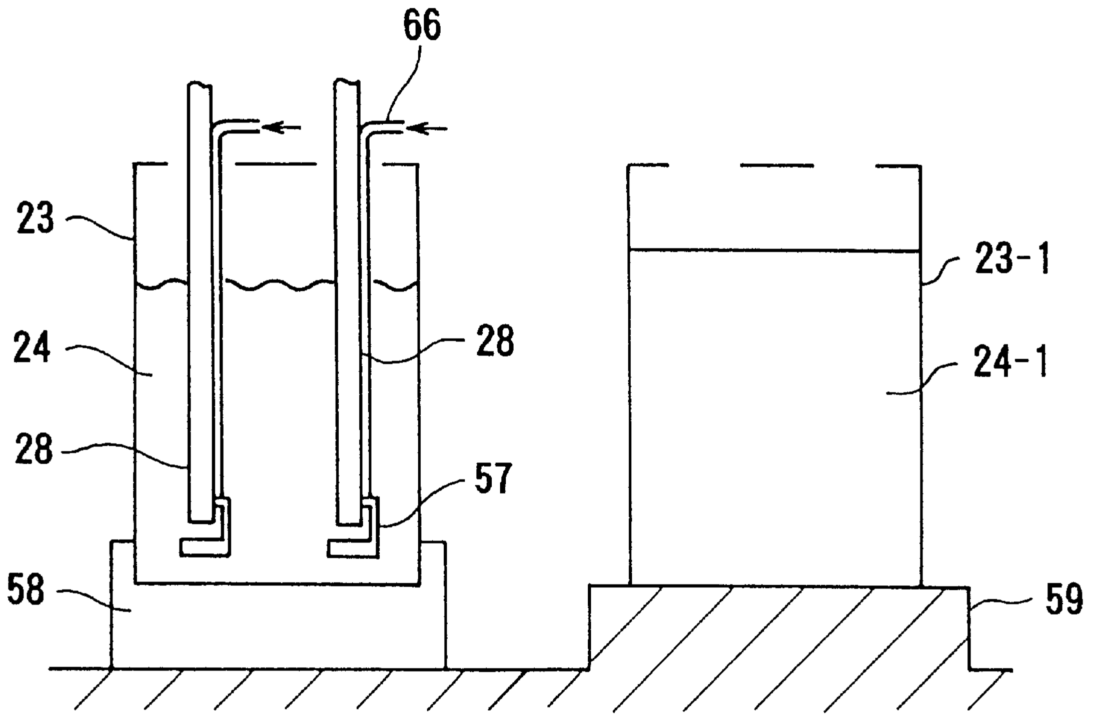
FIG. 12 is a sectional view of principal part of another embodiment of a tank, a powder introducing pipe, a vibrator, etc. used in the pneumatically fed powder supply system according to the present invention.

The powder tanks used in the powder supply system according to the present invention are not limited to those tanks show in FIGS. 1, 2, 4, 5, 6, 7 and 8 in which part of a bottom portion of the tank is modified to form a fluidizing device. The entire bottom portion may be constructed to form the fluidizing device. Additionally, a partially fluidizing device 57 may be provided near a lower end opening of the powder introducing pipe 28, as shown in FIG. 12, without forming the fluidizing device in the bottom portion of the tank 23 itself. In this case, the powder tank 23 under operation is often placed on a vibrator 58. The arrangement that a vibrator is provided on the powder introducing pipe itself is also includes in the present invention. The partially fluidizing device usually requires an air feed device which is shown as an air feed pipe 66 in FIG. 12.

Since the embodiment of FIG. 12 needs no fluidizing means provided on the tank 24, the tank structure becomes simple. Only one vibrator 58 is required to be installed for the tank 23 under operation and, therefore, the system is considerably simplified and the installation can be cut down.

The powder introducing pipe 28 provided with the partially fluidizing device 57 shown in FIG. 12 may also be employed, if is necessary, in any of the systems according to the present invention as shown in FIG. 1, 5 and 8.

In FIG. 12, denoted by 23-1 is a standby powder tank placed on a pedestal 59 and 24-1 is powder in different color. The pinch valve shown in FIG. 3 may be additionally provided. The powder introducing pipe 28 may be flexible. The position at which the powder introducing pipe is open in the tank is not limited to a lower portion of the powder layer, but may be open in an upper portion of the powder layer through floating means. In this case, the opening end of the powder introducing pipe is moved up and down responsibly to vertical change in level of the powder layer.

Figure 10:
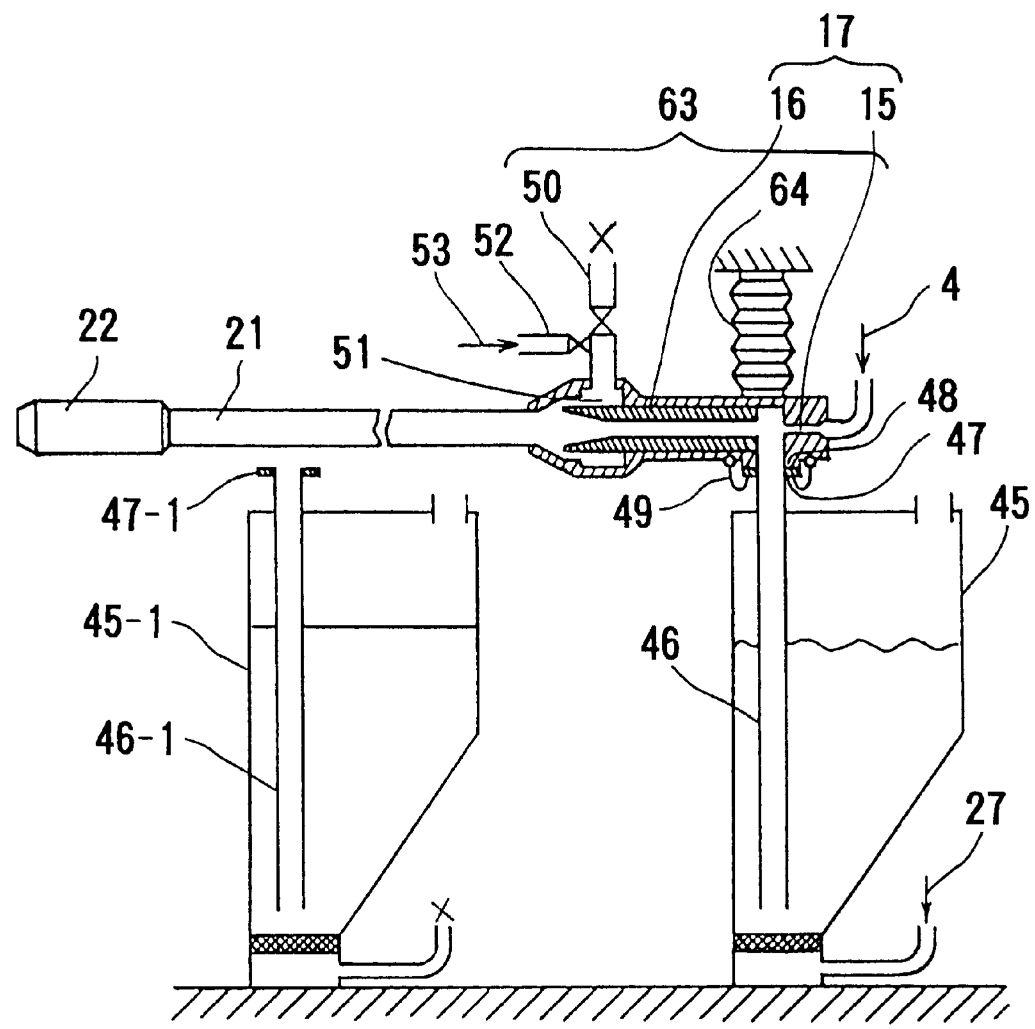
FIG. 10 is a sectional view of principal part of a powder coating apparatus utilizing a pneumatically fed powder supply system according to the present invention, the view showing still another embodiment different from those shown in FIGS. 1 and 7.

The cleaning means for the powder introducing pipe 28 provided with the air pipe 66, which is shown in FIG. 12, is not shown in FIG. 10. However, in fact, the cleaning means is provided on each of the tanks or the separate cleaning means is installed similarly to the embodiments shown in FIGS. 1, 2, 3, 4, 5 and 6. For the case of FIG. 12, the use of the separate cleaning means is also effective to simplify the tank structure.

Figure 13:
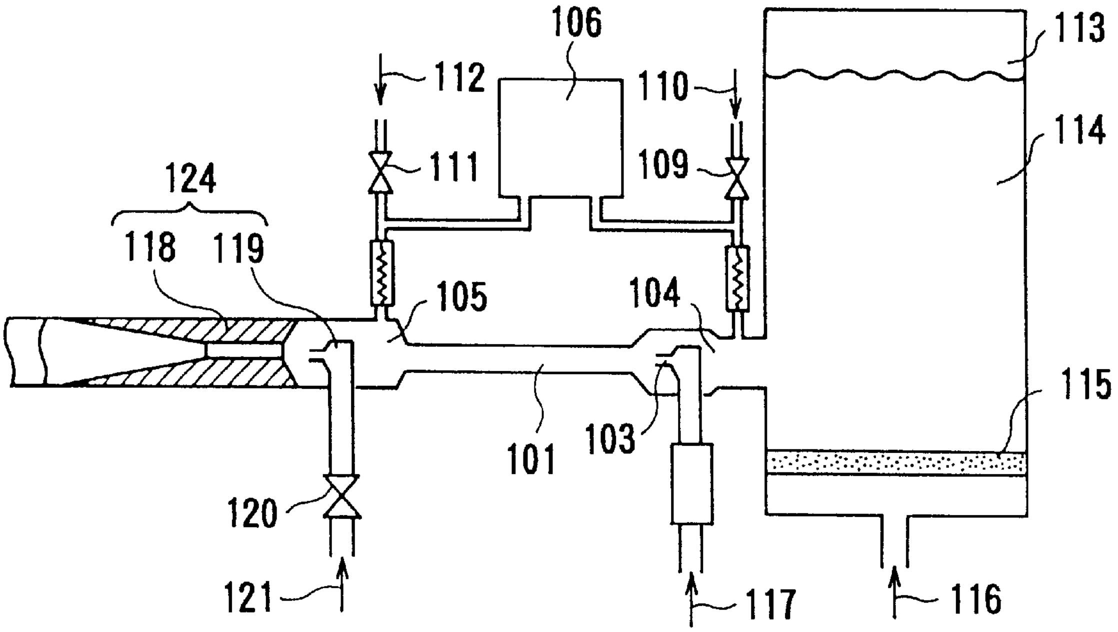
Fig. 13 PRIOR ART
FIG. 13 is a vertical sectional view of a powder supply apparatus of the prior art.
Figure 14:
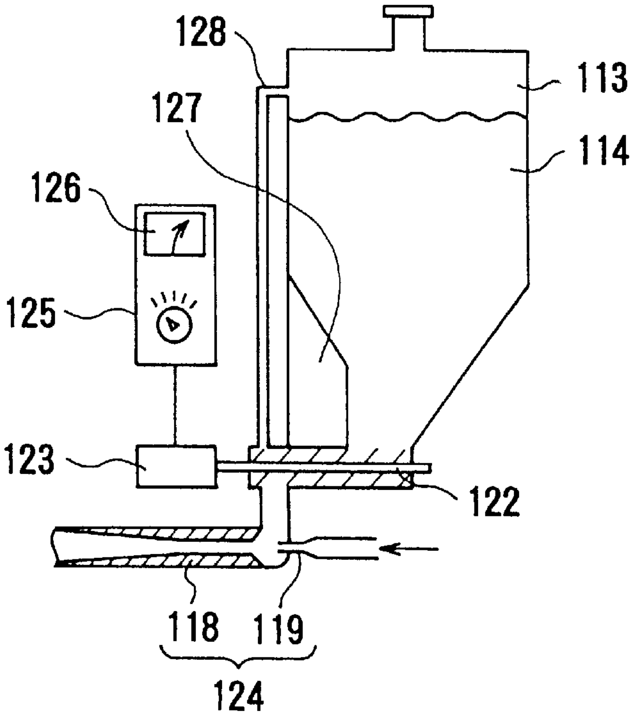
Fig. 14 PRIOR ART
FIG. 14 is a vertical sectional view of another powder supply apparatus of the prior art.

In the embodiments shown in FIGS. 1, 7 and 8, the differential pressure generated across the measuring thin pipe line for detecting the mass flow rate of the powder is detected by the differential pressure sensor 6, which forms a blind pipe line during the normal operation, through the filters 5 made of a material to which powder is hard to stick. But the differential pressure detecting means is not limited to the arrangement employed in the above embodiments. In some cases, it is also practically possible to detect the differential pressure while introducing gases 110, 112 through respective differential pressure detecting ports, like the prior art shown in FIG. 13, without providing filters.

Figure 11:
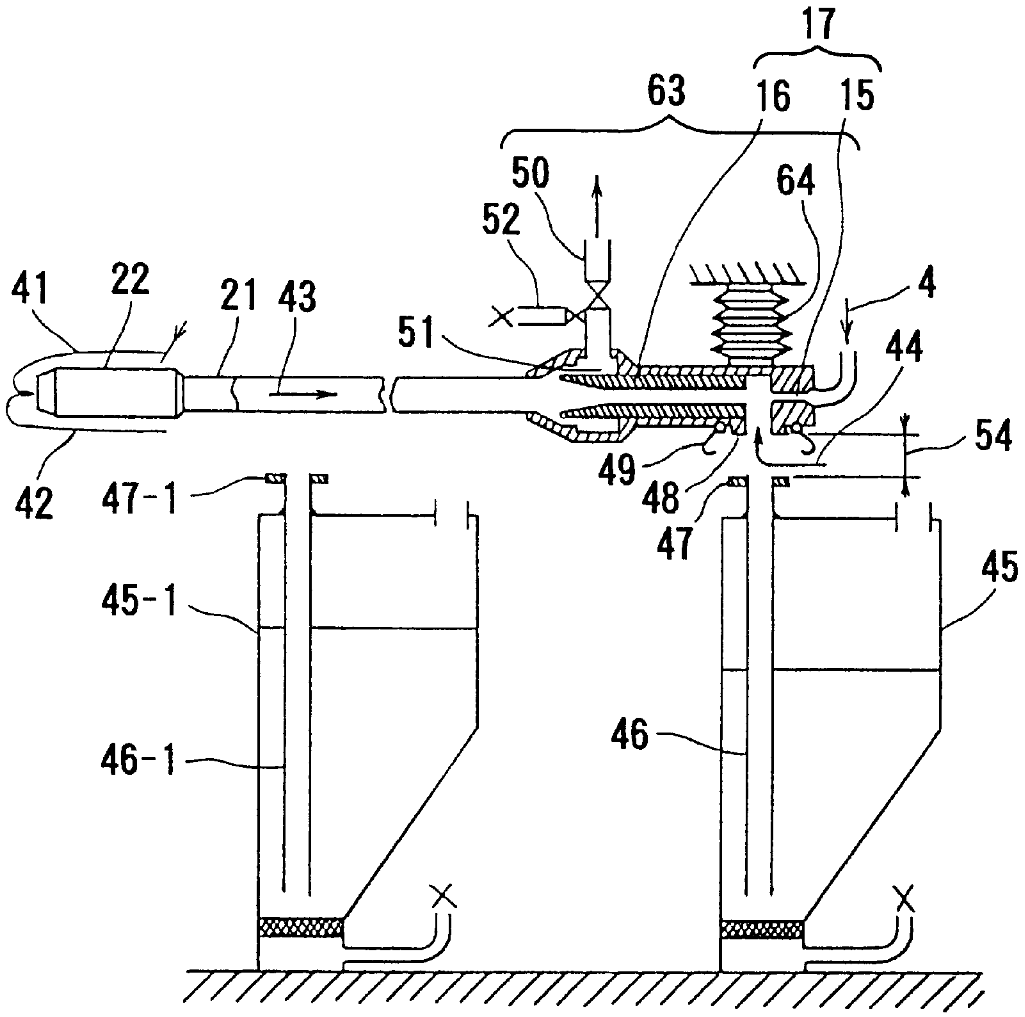
FIG. 11 is a sectional view of principal part of the apparatus having the structure shown in FIG. 10 under cleaning in the course of color changing.

In the case that the powder feeding thick pipe line is short, the powder has a property not tending to stick, and the thickness of a coated film is not required to be so accurate for the reason, e.g., that the powder is not expensive, the means for detecting and controlling the mass flow rate of the powder, shown in the embodiments of FIGS. 1 and 7, can be dispensed with depending on situations. FIG. 10 shows a state of the system under operation in that case, and FIG. 11 shows a cleaning step to effect the color changing. As shown in FIG. 11, reference numeral 41 represents the outer surface cleaning gas for gun 22, while reference numeral 42 represents clean ambient air. FIGS. 10 and 11 correspond to FIGS. 7 and 8, respectively, and the entire system configuration is the same as shown in FIG. 9. In FIGS. 10 and 11, denoted by 63 is a powder supply apparatus used that case, and 64 is means for vertically moving the powder supply apparatus 63. Other components in FIGS. 10 and 11 having the same functions as those in FIGS. 7 and 8 are denoted by the common reference numerals. Though not shown, the mass flow rate of powder during the normal operation can be controlled by measuring and indicating the blowing pressures, flow rates, etc. of the driving gas 4 for the injector and the powder carrier gas 53.

In some of the above embodiments, the means such as the pipe line 50 for sucking the gas discharged during the cleaning and preventing the gas containing the powder from being discharged through the gun, etc. in the cleaning step to effect the color changing is provided around the injector throat 16. But, the invention is not limited to such an arrangement. So long as the intended object is achieved, the sucking means may be provided in other position, or in plural number.

In the embodiment shown in FIGS. 1 and 4, it is required to clean the inner surface of the powder introducing pipe 28 in the color changing operation. To this end, the inner diameter of the pipe 28 is preferably set equal to or thinner than that of the powder feeding thick pipe line 21.

Usable as the gun 22 in the above description is any type of electrostatic powder coating gun generally employed to carry out electrostatic powder coating by charging powder with electricity under corona discharge, tripo charging or the like. A power supply, a delivery pattern control/operation system, etc. are not shown in the drawings.

The multicolor pneumatically fed powder supply system described above is also applicable to other field than electrostatic powder coating to achieve the similar object.

In the multicolor pneumatically fed powder supply system of the present invention, as compared with the prior art systems, the paint coating apparatus has a much simpler and smaller structure, the system configuration is simpler, the equipment cost is reduced, and the installation/setup work is simpler and finished in a shorter time with a lower cost.

Further, the color changing operation is surely performed in a short time without contaminating the inner space of the booth, and a preliminary paint blow after the color changing is finished in a small amount and in a short time. Therefore, the effective rate of operation of the entire coating plant is increased, the effective availability ratio of the powder is also increased, and the maintenance/service cost is reduced. As a result, the system of the present invention is very effective in cutting down the overall operation cost required for the entire electrostatic powder coating apparatus. Also, since the tank has a very simple structure and is easy to clean, the equipment cost is held down even when many tanks are prepared for multicolor coating, and the paint in the tank can be easily replaced by another one in a short time. The system of the present invention can be easily automated. This make it possible to further shorten the color changing time and reduce the overall operation cost. Moreover, the present invention surely prevents variations in the amount of supplied paint between before and after the color changing, which has often occurred in the prior art. Additionally, the optimum amount of supplied powder corresponding to an optimum film thickness of powder in each color can be easily set, which contributes to saving of the paint cost. The prior art had a difficulty in preventing large loss of the paint powder in part because the amounts of supplied powder in other colors had to be set in match with the amount of supplied powder that has the weakest hiding power.

What is claimed is:

1. A pneumatically fed powder supply system comprising:

a powder tank;

a powder supply apparatus detachably connected to said powder tank, wherein said powder supply apparatus is a powder supply apparatus for feeding powder through a pipe line with gas, said powder supply apparatus comprising means for supplying part of carrier gas as powder flow detecting gas while regulating a flow rate of said powder flow detecting gas, a sensor nozzle provided downstream of said supplying means for passing said powder flow detecting gas therethrough, a powder flow measuring pipe line disposed downstream of and adjacent to said sensor nozzle and having an inlet and an outlet, means for introducing the powder to the inlet of said powder flow measuring pipe line, a powder feeding pipe line coupled to a downstream end of said powder flow measuring pipe line, said powder flow measuring pipe line inlet and outlet having a diameter smaller than the diameter of said powder feeding pipe line, and means for adjusting a pressure difference between the inlet and the outlet of said powder flow measuring pipe line, said powder introducing means being formed of a powder introducing pipe which is open to a powder layer in said powder tank under operation; and cleaning means slidably disposed in proximity to an outer surface of said powder introducing pipe for cleaning said powder introducing pipe as said powder introducing pipe is removed from said powder layer in said powder tank.

2. A pneumatically fed powder supply system according to claim 1, wherein said means for cleaning said powder supply apparatus includes means for cleaning the interior of said powder supply apparatus in a condition where said tank is disconnected from said powder supply apparatus, when color changing is to be effected.

3. A pneumatically fed powder supply system according to claim 2, wherein said powder supply apparatus is detachably connected to a powder introducing pipe attached in said tank.

4. A pneumatically fed powder supply system according to claim 2, wherein said powder supply apparatus includes means for sucking gas discharged during cleaning.

5. A pneumatically fed powder supply system according to claim 1, wherein said powder introducing pipe is provided at its lower end with a means for partially fluidizing the powder.

6. A pneumatically fed powder supply system according to claim 5, wherein said powder supply apparatus includes means for sucking gas discharged during cleaning.

7. A pneumatically fed powder supply system according to claim 1, wherein said powder supply apparatus is detachably connected to a powder introducing pipe attached in said tank.

8. A pneumatically fed powder supply system according to claim 7, wherein said powder supply apparatus includes means for sucking gas discharged during cleaning.

9. A pneumatically fed powder supply system according to claim 1, wherein said powder supply apparatus includes means for sucking gas discharged during cleaning.

10. A pneumatically fed powder supply system for a powder coating apparatus in which a color of the powder may be changed, said powder supply system comprising:

a pneumatically fed powder supply apparatus;

a powder tank;

a powder introducing pipe inserted in said powder tank and detachably interconnecting said powder supply apparatus to said powder tank; and cleaning means for cleaning an inner surface of said powder supply apparatus after a portion of said powder supply apparatus has been detached from said powder tank by drawing in clean ambient air through the detached portion, wherein said powder supply apparatus comprises:

gas supply means for supplying part of a carrier gas as a powder flow detecting gas while regulating a flow rate of said powder flow detecting gas;

a sensor nozzle coupled to, and provided downstream of, said gas supply means for passing said powder flow detecting gas therethrough;

a powder flow measuring pipe line having an outlet and an inlet that is coupled to said sensor nozzle for receiving the powder flow detecting gas;

means operatively coupled to the inlet of said powder flow measuring pipe line for introducing the powder to the inlet of said powder flow measuring pipe line;

a powder feeding pipe line coupled to the outlet of said powder flow measuring pipe line and having a diameter that is larger than that of said powder flow measuring pipe line; and means for adjusting a pressure difference between the inlet and the outlet of said powder flow measuring pipe line.

11. The pneumatically fed powder supply system according to claim 10, wherein said means for cleaning said powder supply apparatus cleans said powder supply apparatus by high-speed air ventilation when said powder tank is disconnected from said power supply apparatus.

12. The pneumatically fed powder supply system according to claim 10, wherein said powder introducing pipe has a first opening at a lower end and a second opening at an upper end, said first opening is inserted into a powder layer within said powder tank and said second opening is detachably connected to said powder supply apparatus.

13. An apparatus for powder coating a work piece, the apparatus including a pneumatically fed powder supply system comprising:

a powder tank;

a powder supply apparatus detachably connected to said powder tank, wherein said powder supply apparatus is a powder supply apparatus for feeding powder through a pipe line with gas, said powder supply apparatus comprising means for supplying part of carrier gas as powder flow detecting gas while regulating a flow rate of said powder flow detecting gas, a sensor nozzle provided downstream of said supplying means for passing said powder flow detecting gas therethrough, a powder flow measuring pipe line disposed downstream of and adjacent to said sensor nozzle and having an inlet and an outlet, means for introducing the powder to the inlet of said powder flow measuring pipe line, a powder feeding pipe line coupled to a downstream end of said powder flow measuring pipe line, said powder flow measuring pipe line inlet and outlet having a diameter smaller than the diameter of said powder feeding pipe line, and means for adjusting a pressure difference between the inlet and the outlet of said powder flow measuring pipe line, said powder introducing means being formed of a powder introducing pipe which is open to a powder layer in said powder tank under operation; and cleaning means slidably disposed in proximity to an outer surface of said powder introducing pipe for cleaning said powder introducing pipe as said powder introducing pipe is removed from said powder layer in said powder tank.

14. A pneumatically fed powder supply system comprising:

a powder tank;

a plurality of powder introducing pipes inserted in said powder tank and coupled together by a manifold at their upper ends;

a plurality of powder supply apparatuses coupled together by a manifold, wherein said manifold of said powder supply apparatuses is detachably connected to said manifold of said powder introducing pipes; and cleaning means for drawing in ambient air from said manifold of said powder supply apparatuses when a small stroke is created between said manifold of said apparatuses and said manifold of said powder introducing pipes.

15. A powder coating apparatus including a pneumatically fed powder supply system comprising:

a powder tank:

a powder supply apparatus detachably connected to said powder tank, wherein said powder supply apparatus is a powder supply apparatus for feeding powder through a pipe line with gas, said powder supply apparatus comprising means for supplying part of carrier gas as powder flow detecting gas while regulating a flow rate of said powder flow detecting gas, a sensor nozzle provided downstream of said supplying means for passing said powder flow detecting gas therethrough, a powder flow measuring pipe line disposed downstream of and adjacent to said sensor nozzle and having an inlet and an outlet, means for introducing the powder to the inlet of said powder flow measuring pipe line, a powder feeding pipe line coupled to a downstream end of said powder flow measuring pipe line, said powder flow measuring pipe line inlet and outlet having a diameter smaller than the diameter of said powder feeding pipe line, and means for adjusting a pressure difference between the inlet and the outlet of said powder flow measuring pipe line, said powder introducing means being formed of a powder introducing pipe which is open to a powder layer in said powder tank under operation; and cleaning means slidably disposed in proximity to an outer surface of said powder introducing pipe for cleaning said powder introducing pipe as said powder introducing pipe is removed from said powder layer in said powder tank, said cleaning means includes means for cleaning the interior of said powder supply apparatus in a condition where said powder tank is disconnected from said powder supply apparatus when color changing is to be effected.

* * * * *

UNITED STATES PATENT AND TRADEMARK OFFICE

CERTIFICATE OF CORRECTION

PATENT NO. : 5,928,423
DATED : July 27, 1999
INVENTOR(S) : Hiromichi Toyota et al.

It is certified that error appears in the above-identified patent and that said Letters Patent is hereby corrected as shown below:

[73] Assignee: "Rid Corporation" should be --RID Corporation--.

Errors of Record, Column 4, line 24;
"Fig. 13" should be --Fig. 15--.

Signed and Sealed this

Twenty-ninth Day of May, 2001

Attest:

NICHOLAS P. GODICI

*Attesting Officer* — *Acting Director of the United States Patent and Trademark Office*